United States Patent Office 3,618,298
Patented Nov. 9, 1971

3,618,298
SYSTEM FOR PURIFYING A PARTICLE-LADEN GASEOUS STREAM
Jacques Curchod, Mont-sur-Rolle, Switzerland, assignor to Curchod Baeriswyl & Cie S.A., Rolle, Switzerland
Continuation-in-part of application Ser. No. 781,905, Dec. 6, 1968. This application Apr. 6, 1970, Ser. No. 26,041
Claims priority, application Switzerland, Apr. 26, 1968, 6,192/68
Int. Cl. B01f 3/04
U.S. Cl. 55—226                              7 Claims

ABSTRACT OF THE DISCLOSURE

An installation for purifying a particle-laden gas stream comprises an enclosure partially fillable with liquid to a certain level when the installation is at rest. An inlet and outlet are located above that level and the outlet co-operates with suction means for drawing a gaseous stream. A deflector having a lower surface below said certain level is located between the inlet and outlet so as to direct a gas stream on to the liquid approximately perpendicular to the surface thereof. A saw-tooth baffle follows the deflector and the or each lower edge of the baffle downstream of the deflector is sucessively higher than the lower surface of the deflector. The baffles may be at least partially fixed to a movable cover to ease cleaning of the installation. Two sets of deflectors and baffles may be placed converging together in V formation to increase the area of contact of the gas with the liquid.

---

This application is a continuation-in-part of copending application Ser. No. 781,905, filed Dec. 6, 1968 and now abandoned.

The present invention is concerned with installations for the purification of particle-laden streams wherein the gas stream is directed towards the surface of a liquid by a series of baffles so that the particles such as dust in the gas stream are removed by the liquid.

It is an object of the invention to provide an improved installation of the above-mentioned type.

The accompanying drawings show, by way of example, several embodiments of the present invention.

Figure 1:
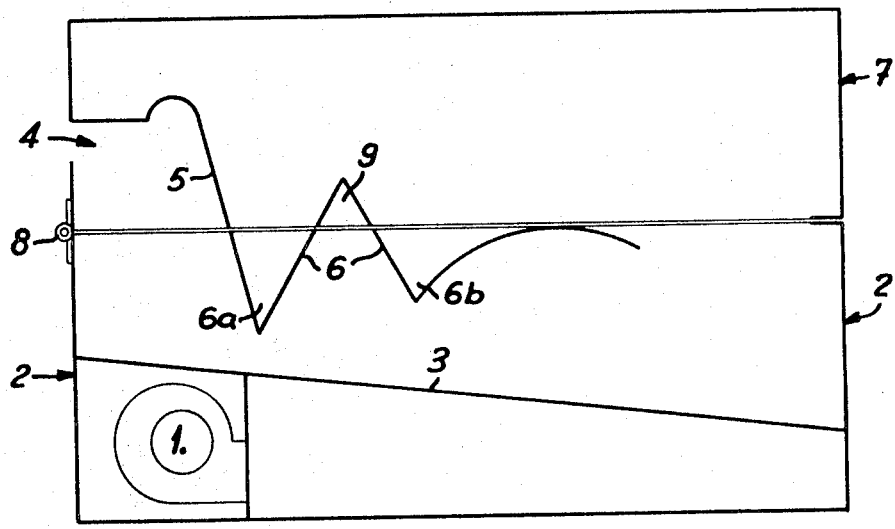
FIG. 1 is a schematic cross-section of a first embodiment of an installation.

The installation shown in FIG. 1 comprises a blower 1 positioned in the bottom of the frame 2 for providing circulation of the gaseous stream. This blower is located under the upper part of the inclined surface 3 forming the bottom of the vat in which is provided liquid the level of which is maintained constant (during the rest state of the installation) by a device, not shown, which also ensures that the liquid is constantly changed so as to remove particles such as dust removed from the gas stream by the liquid.

The suction side of blower 3 is connected by pipes (not shown) located at the back part of a cover 7 so as to create a depression inside the apparatus. The stream to be purified is thus sucked in through opening 4 and is directed perpendicularly to the liquid surface by means of a deflector 5 followed by a baffle 6 constituted by two elements 6a and 6b of which the surfaces are immersed in the liquid when the installation is not operating and which are V-shaped so as to create vortices in the circulating stream. The deflector 5 and baffle 6 extend across the entire width of the frame 2. The gaseous stream then passes through filters, not shown, before leaving the installation. When the installation is in operation, the level of the liquid is of course no longer uniform and flat but is disturbed in the neighbourhood of the deflector to allow passage of the gaseous stream. In fact, the level is raised downstream of the deflector because of the decrease in pressure due to the action of the blower, whilst the level is lowered upstream. As soon as the level of liquid upstream of deflector 6a (i.e. to the left in FIG. 1) descends to the edge or deflector 6a, a current of gas passes around this edge and the levels of liquid on either side of the deflector tend to equalise. In practice, the levels oscillate and turbulences caused by the passage of air do not allow the suruface to remain at a constant level.

A cover 7 is pivoted on the frame 2 by means of hinge 8. This cover is dimensioned so that elements in line forming the upper part of deflector 5 and the top 9 of baffle 6 are integral with the cover whilst the elements 6a and 6b are integral with the frame which facilitates the cleaning of the baffle.

According to the dimensions of the installation, it is possible to provide a baffle having a greater number of elements. In this case, the walls of the baffles can be pivotable so as to enable variation of the orientation of the chambers to adapt them to the speed and flow of the gas to be purified.

Figure 2:
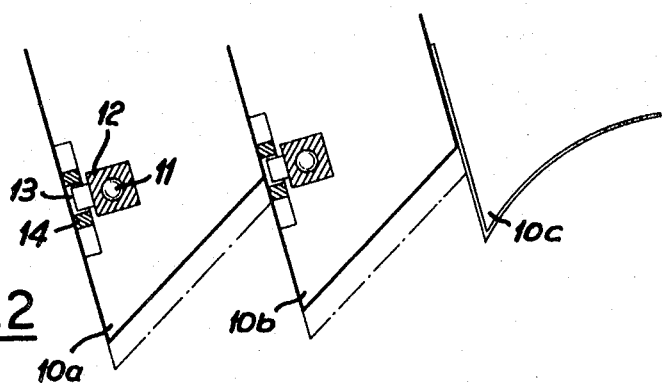
FIG. 2 shows a detail of the baffle in another embodiment.

Shown in FIG. 2 is a baffle formed of three V-shaped elements 10a, 10b, and 10c which can move individually in the direction of the liquid surface. The movement of elements 10a and 10b is controlled from the outside by means of endless screw 11, fast with an element 12 engaging in an oblique slot 13 of a slide 14. By means of such a system, it is possible to control this movement from the outside during operation of the installation. In the arrangement of FIG. 2 all of the deflector/baffle parts 10a, 10b and 10c can be made integral with the cover 7 so that they are easily accessible for the purposes of cleaning.

Alternatively, it is possible to provide a baffle with another shape, for example consisting of arcs of a circle.

It is important to note that in operation the deflector (6a FIG. 1 and 10a FIG. 2) actually dips below the level of the liquid which, of course, varies somewhat as mentioned above. The further baffle edges (6b and 10b and 10c respectively) may or may not be below the level of liquid adjacent thereto, either at rest or in operation. In general, it is advantageous to operate a device with the baffles of FIG. 2 in the following manner. At rest, deflector 10a is below the liquid surface, whilst the edge of baffles 10b and 10c is above. In operation, the pressure differential can be such that the level of liquid successively rises between edges 10a and 10b, and 10b and 10c so that both 10a and 10b act as deflectors dipping below the liquid surface in the vicinity thereof whereas 10c rests above the liquid surface and acts as a baffle to create turbulence in the gas flow. Of course, the actual operation can be varied by varying the suction of blower 1, by varying the height of the deflector and/or baffle edges, and by varying the angles of the deflector surfaces, or even by altering the quantity of liquid in the vat, all of these manipulations being possible during operation or prior to operation.

In this manner, an extremely effective removal of dust or other particles from the gas stream is obtained. The amount of liquid, such as water, in the purifying vat is left constant and the liquid is recycled to eliminate the dust or other particles suspended therein. In view of the change of liquid level between the rest and operational states, it is not possible to use a normal constant head device, but it is preferable to use a pump to extract liquid at a certain rate and to supply purified liquid at the same rate.

Figure 4:
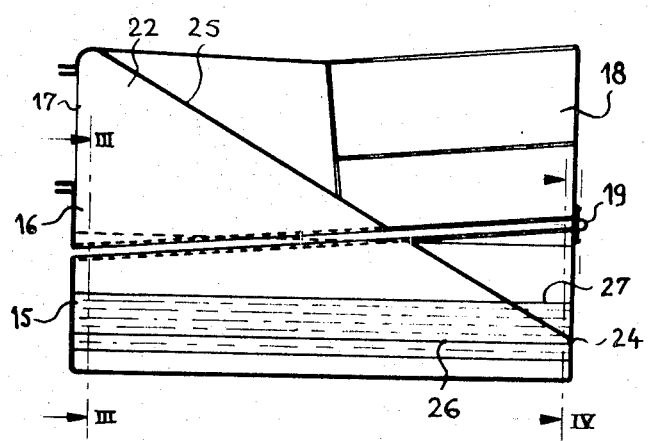
FIG. 4 is an elevational cross-section taken along line II—II of FIG. 3.
Figure 5:
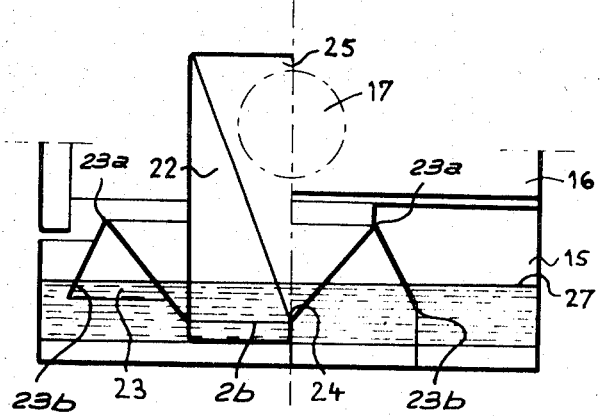
FIG. 5 shows, in its left-hand half a schematic view partly in cross-section along line III—III and in its right-hand half a schematic view partly in cross-section along line IV—IV of FIG. 4.
Figure 3:
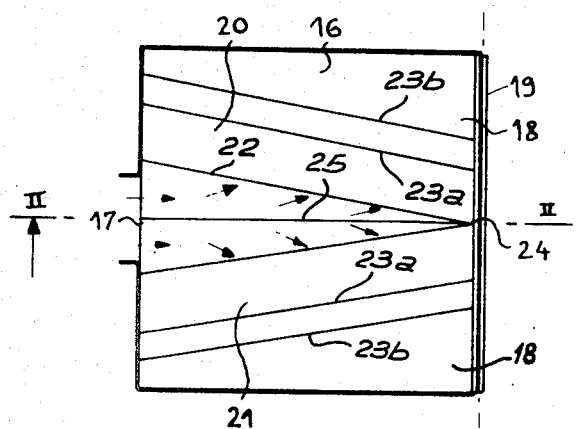
FIG. 3 is a schematic plan of a further embodiment.

The embodiment shown in FIGS. 3–5 comprises a lower part 15 forming a vat containing liquid, for example water, on which is pivoted an upper part 16 forming a cover. The water level shown is, of course, in the rest state. The cover 16 has a circular inlet 17 through which the gas stream passes to leave by two outlets 18 and 19 facing the inlet.

The installation comprises two rectilinear assemblies 20 and 21 each comprising a deflector 22 and a saw-tooth baffle 23. The baffles 23 each have an upper edge 23a above the level of the liquid and a lower edge 23b dipping into the liquid. The triangular-shaped deflectors 22 converge to a point 24. They are connected by an oblique wall 25, the elements 22 and 25 forming with the bottom 26 an oblique pyramid-shaped chamber. The walls 22 and 25 of this chamber are divided into two, the upper part being part of the cover 16 whilst the lower part is part of the vat 15. This, as before, greatly facilitates access to the installation for cleaning purposes. The edges of the baffles are horizontal so as to be parallel to the level of the water at rest.

The installation is, of course, completed by a blower (not shown) positioned at the outlet and sucking the gas stream through the installation. The arrows on FIG. 3 show part of the gas stream arriving against the deflector. The gas stream is thus directed substantially perpendicularly to the surface of the liquid and passes under edge 26, after which it rises, then descends below edge 23b after which it can be extracted through outlets 18 and 19.

It has been noted that the losses of pressure are not only lower than for the installation described with reference to FIG. 1 in which the gas stream hits the baffle perpendicularly, but that gas stream is distributed in an almost uniform manner along the baffles.

This arrangement additionally allows considerable increase of the contact surface between the gas and the liquid in comparison with an installation according to an embodiment according to FIG. 1 of equal bulk.

What is claimed is:

1. Installation for purifying a particle-laden gas stream comprising an enclosure partially fillable with a liquid to a certain level when the installation is at rest, said enclosure having an inlet above said certain level for the entry of a gaseous stream to be purified and an outlet substantially above said certain level for the removal of purified gas, suction means co-operating with said outlet for drawing a stream of gas through said installation, a deflector between said inlet and said outlet, said deflector extending across said enclosure and having a lower surface extending below said certain level so as to direct said gas stream onto said liquid approximately perpendicular to the surface of the liquid when at rest, and a saw-tooth baffle between said deflector and said outlet, said baffle having at least one inverted V-shaped element, one of the legs of said element being formed by part of said deflector, the or each lower edge of said baffle downstream of said deflector being successively higher than said lower surface of said deflector in relation to said certain level.

2. Installation according to claim 1, wherein said enclosure comprises a cover hinged to a lower part thereof forming a purification vat, and wherein at least part of said deflector and/or said baffle is integral with said cover.

3. Installation according to claim 1, wherein the said downstream portion of said saw-tooth baffle has a downwardly-directed concave portion.

4. Installation according to claim 1 wherein said deflector and/or said baffle is/are positionally adjustable in said enclosure by control means located outside of said enclosure.

5. Installation according to claim 1, comprising two assemblies each formed by a deflector and a baffle, these assemblies being at least approximately rectilinear and converging obliquely, from the top to the bottom of said enclosure and towards one another so that said inlet is directed towards an entry chamber tapered in the horizontal and in the vertical planes.

6. Installation according to claim 5, comprising two outlets each in communication with suction means, one outlet being provided for each of said assemblies.

7. Installation according to claim 6, wherein said enclosure comprises a cover hinged to a lower part thereof forming a purification vat, and wherein at least part of said deflector and/or said baffle is integral with said cover.

References Cited

UNITED STATES PATENTS

| | | | |
|---|---|---|---|
| 283,025 | 8/1883 | Rowan | 55—244 X |
| 585,568 | 6/1897 | Greiwe | 55—239 |
| 716,380 | 12/1902 | Clawson | 261—119 |
| 1,067,321 | 7/1913 | Delaney | 261—119 X |
| 1,730,212 | 10/1929 | Ireland | 261—119 |
| 1,886,192 | 11/1932 | Jones | 261—112 X |
| 2,459,635 | 1/1949 | Fenn | 261—119 |
| 2,491,645 | 12/1949 | Clark et al. | 261—119 X |
| 2,806,466 | 9/1957 | Thompson | 261—119 X |
| 3,353,336 | 11/1967 | Caballero | 55—244 X |
| 3,386,229 | 6/1968 | Reed | 55—248 X |

TIM R. MILES, Primary Examiner

U.S. Cl. X.R.

55—244; 261—62, 119